United States Patent [19]

Moser et al.

[11] 4,407,449

[45] Oct. 4, 1983

[54] SYSTEM FOR HEATING THE SERVICE CABIN OF A MACHINE OPERATED BY AN INTERNAL CUMBUSTION ENGINE

[75] Inventors: Gottfried Moser, Bergisch Gladbach; Walter Nau, Cologne; Ernst D. Neumann, Aachen, all of Fed. Rep. of Germany

[73] Assignee: Klockner-Humboldt-Deutz AG, Cologne, Fed. Rep. of Germany

[21] Appl. No.: 315,857

[22] Filed: Oct. 28, 1981

[30] Foreign Application Priority Data

Nov. 18, 1980 [DE] Fed. Rep. of Germany ....... 3043457

[51] Int. Cl.³ .............................................. B60H 1/02
[52] U.S. Cl. .................................. 237/12.3 R; 122/26; 237/1 R; 126/247
[58] Field of Search .......................... 126/247; 122/26; 237/12.3 R, 1 R, 1 SL, 12.3 A

[56] References Cited

U.S. PATENT DOCUMENTS 4,060,194  11/1977  Lutz .................................... 122/26

FOREIGN PATENT DOCUMENTS 2916870  11/1980  Fed. Rep. of Germany ........ 122/26

*Primary Examiner*—Albert J. Makay
*Assistant Examiner*—Henry Bennett
*Attorney, Agent, or Firm*—Watson, Cole, Grindle & Watson

[57] ABSTRACT

A heating system for the service cabin of a machine operated by an internal combustion engine includes a high-pressure supply pump for feeding oil from the engine oil sump through an oil conduit and returning it thereto, a pressure-reducing element in the conduit for elevating the temperature of the oil, a line by-passing the element and having a flow control valve therein, a heat exchanger connected into the conduit downstream of the element, the pump being located within the internal combustion engine together with its high pressure line to thereby confine any high pressure leaks from such line to the interior of the engine and its oil sump.

5 Claims, 3 Drawing Figures

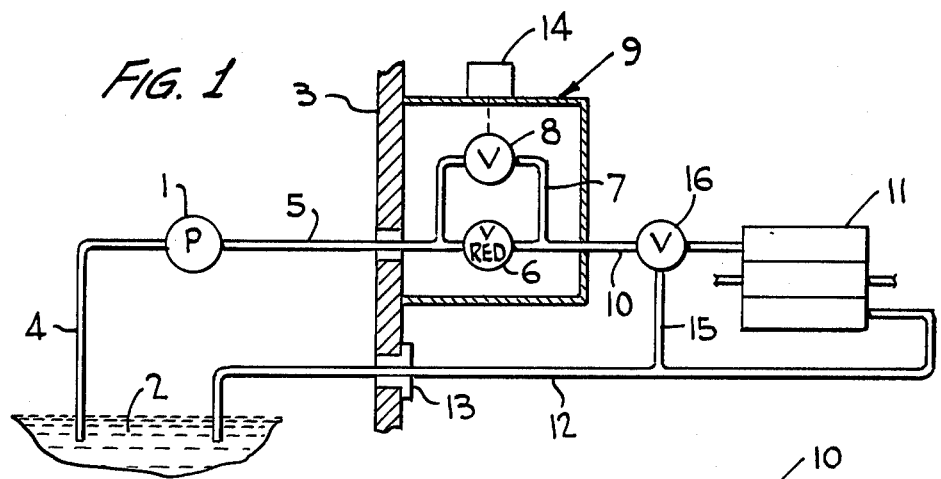
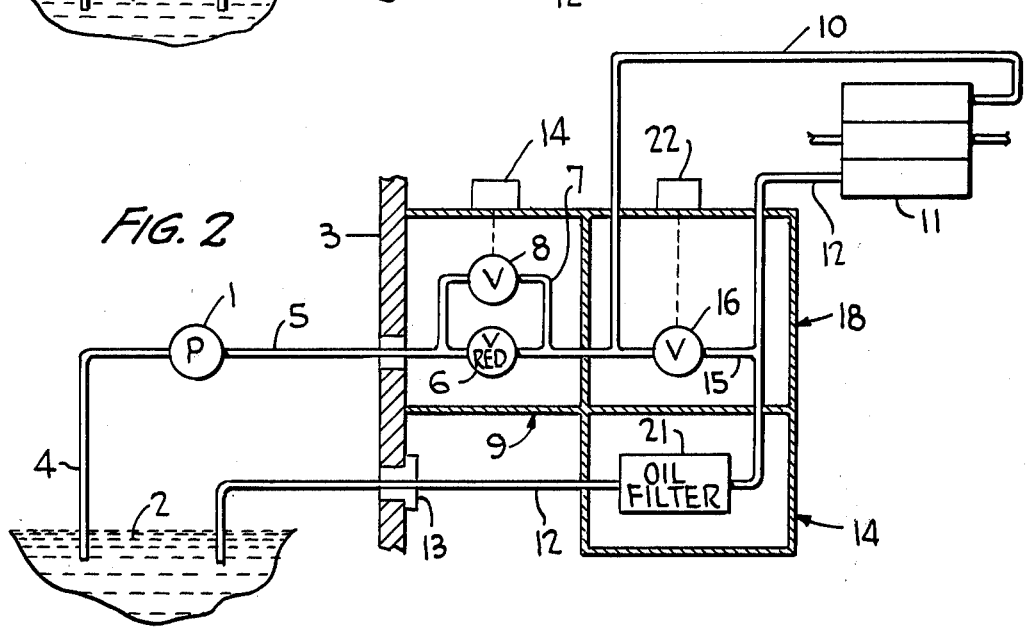
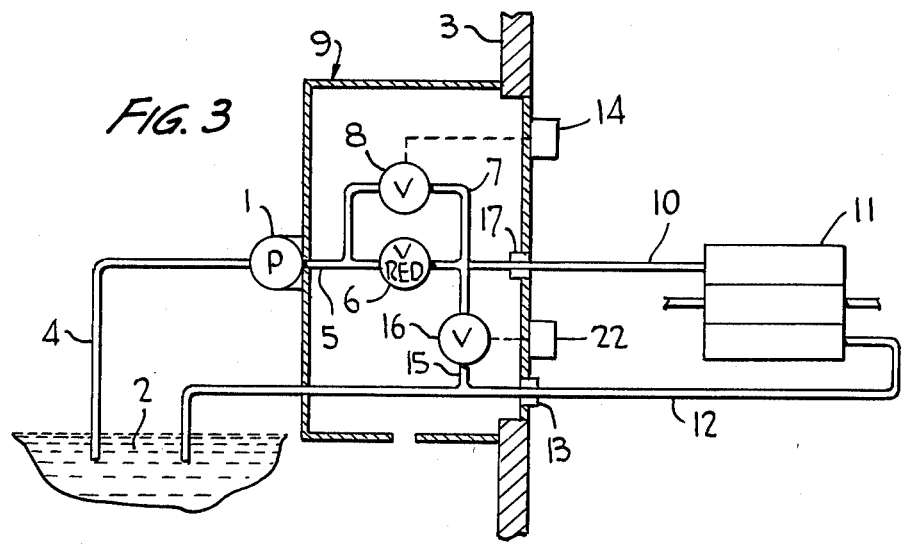

SYSTEM FOR HEATING THE SERVICE CABIN OF A MACHINE OPERATED BY AN INTERNAL CUMBUSTION ENGINE

BACKGROUND OF THE INVENTION

This invention relates generally to a system for heating the service cabin of a machine operated by an internal combustion engine, wherein heated oil is fed by a high-pressure supply pump from the engine oil sump through an oil conduit and returned to the oil sump, a pressure-reducing element in the conduit for elevating the temperature of the oil flowing therethrough, a line by-passing the element and having a flow control valve therein, a heat exchanger in the conduit downstream of the element and located in the service cabin for heating the area thereof.

In a known arrangement of this general type, both the high-pressure supply pump and the pressure-reducing element are located outside the internal combustion engine and are connected via external lines with the interior of the engine. These external lines, carrying heating medium under high-pressure, are particularly susceptible to rupture and leakage, and because of their external course, present a safety hazard and possible damage to the surroundings outside the engine.

SUMMARY OF THE INVENTION

It is therefore an object of the present invention to provide a heating system of the aforedescribed type with the oil charge of the internal combustion engine serving as a heating medium and operating with a high-pressure supply pump and a pressure-reducing element with a view to enhancing the safety of operation and reducing the danger of accidents.

In accordance with the invention, the heating system of the general type aforedescribed has its high-pressure line, which extends from the high-pressure supply pump to the pressure-reducing element, disposed within the frame or wall casing of the internal combustion engine so that possible oil leakages, which normally occur in this area, cannot cause the oil to escape outwardly and, moreover, cannot expose the internal combustion engine to danger due to an uncontrolled loss of oil. Thus, in the event of damage, only the heating effect of the system is lost, and the arrangement being within the engine casing precludes any harmful effects by rupture of the high-pressure line carrying lubricant at a pressure of about 150 bar. And, the line by-passing the pressure-reducing element and containing a flow control valve may, together with the pressure-reducing element, be contained within a housing to thereby reduce the number of pipe runs. And, by mounting such housing in sealing engagement with the wall casing of the internal combustion engine, the number of pipe lead-throughs in the housing wall can be reduced or can be dispensed with altogether.

The heating system according to the invention likewise provides for another line which by-passes the heat exchanger and includes a flow control valve, and an oil filter in the return line leading from the heat exchanger back to the sump. The housing mounted on the wall casing may contain the oil filter as well as the other by-pass line and its flow control valve, the housing being mounted on an exterior surface of the wall casing. Thus, only the low pressure lines to and from the heat exchanger, which are connected directly to such housing, are located outside the internal combustion engine.

In accordance with another embodiment of the invention, the pressure-reducing element and the flow control valve in the line by-passing same may be disposed in a housing within the internal combustion engine against the wall casing thereof, the high-pressure supply pump being directly mounted on the housing so that the high-pressure line on the pressure side thereof can be dispensed with altogether. The line by-passing the heat exchanger, together with its flow control valve may likewise be contained within the housing mounted in sealing engagement with the interior of the wall casing.

Actuating elements may be provided for both control valves, and each may comprise a tractive electromagnet mounted in sealing engagement against the outside of the housing, control lines thereof extending into the housing and being operatively connected with the flow control valves. Thus, the sensitive actuating elements are protected from the oil mist and from the high temperatures within the internal combustion engine.

BRIEF DESCRIPTION OF THE DRAWINGS

FIGS. 1, 2 and 3 are diagramatic sketches of various heating system arrangements according to the invention, each including a pressure-reducing element and a flow control valve located in a by-pass line, and the remaining system components optionally connected therewith, shown relative to the wall of an internal combustion engine, not otherwise shown.

BRIEF DESCRIPTION OF THE INVENTION

Turning now to the drawings wherein like reference characters refer to like and corresponding parts throughout the several views, the heating system according to FIG. 1 includes a high-pressure supply pump 1 which suctions lubricant from an oil sump 2 of an internal combustion engine which is represented by a portion of its wall casing 3. Thus, when viewing FIG. 1, as well as FIGS. 2 and 3 to be described in more detail hereinafter, the space to the left of wall 3 represents the interior of the internal combustion engine and the space to the right of wall 3 represents the exterior of the internal combustion engine. The pump suctions heated oil which serves as a heating medium and delivers it through a main oil conduit which includes an oil suction line 4 and line 5 at the pressure side of the pump through which the oil flows at a high pressure. The heating medium flows through a pressure-reducing element 6 which reduces the pressure and consequently increases the temperature of the heating medium flowing therethrough. A by-pass line 7 for element 6, which may be in the form of a pressure valve, contains a flow control valve 8. Element 6 and valve 8 are contained within a housing 9 mounted on an exterior surface of wall 3. Downstream of the pressure-reducing element there is connected a flow line 10 to a heat exchanger 11, from which a line 12 returns through a plugged opening 13 in wall 3 of the internal combustion engine to oil sump 2.

An actuating element 14 is operatively connected with flow control valve 8, and is mounted on housing 9. This element 14 may be in the form of a tractive electromagnet, or may be a pneumatic or a hydraulic control element. And, a by-pass line 15 extends between lines 10 and 12 for by-passing the heat exchanger. A flow control valve 16 at the junction between lines 10 and 15 operatively controls the flow of heating medium through the oil/air heat exchanger 11.

Thus, with high-pressure line 5 being located within the internal combustion engine, and since this line is most susceptible to rupture or leakages through its joints because of the high-pressure medium flowing therethrough, oil will be confined within the engine and its oil sump thereby avoiding any injury or damage outside the engine by escaping oil issuing at about 150 bar from the high pressure line. And, with housing 9 in sealing engagement with the wall of the internal combustion engine, the number of pipe lead-throughs in the housing wall can be reduced or can be dispensed within altogether. Moreover, actuating element 14 on the wall of housing is protected against engine oil mist and elevated temperatures within the internal combustion engine.

FIG. 2 illustrates the same basic heating arrangement as that in FIG. 1, so that like elements will be identified by like reference numerals. However, housing 9 is expanded to include a housing component 18 which contains a by-pass line 15 and its flow control valve 16. Housing 9 is further expanded to include yet another housing component 19 containing a lubricating oil filter 21 in return line 12 leading from the heat exchanger. An actuating element 22 is mounted on housing component 18 and is operatively connected with flow control valve 16, this actuating element being similar to element 14 so that it may comprise a tractive electromagnet or some other type of adjusting device. Oil filter 19 is of the standard type and is shown without details such as an over pressure-controlled by-pass line or the like. Thus, the only lines disposed outwardly of the engine are low pressure lines 10 and 12 which are less likely to rupture or leak as compared to high-pressure line 5.

In FIG. 3, housing 9 for pressure-reducing element 6 and its flow control valve 8 is disposed within the internal combustion engine and is mounted in sealing engagement with an inner surface of wall 3. The housing likewise includes a portion of return line 12 from the heat exchanger, and as well as by-pass line 15 and its flow control valve 16. The high-pressure supply pump 1 is flange-mounted directly on housing 9, and lines 10 and 12 extend through plug seals 17 and 13 of the housing 9 so as to completely seal off the interior of the internal combustion engine from actuating elements 14 and 22 and from the heat exchanger as well as from low pressure lines 10 and 12. Thus, only the flow and return lines, which are subjected to low pressure, and the temperature-sensitive control elements 14 and 22 are disposed outwardly of the engine, while all other parts of the heating system are arranged as a compact unit within the internal combustion engine in such a manner that high-pressure line 5 is incorporated into housing 9 and into the housing of pump 1, thereby dispensing with the high-pressure line altogether. And, the sensitive actuating elements 14 and 22 are protected from engine oil mist and from temperatures from within the internal combustion engine.

Obviously, many modifications and variations of the present invention are made possible in the light of the above teachings. It is therefore to be understood within the scope of the appended claims the invention may be practiced otherwise than as specifically described.

What is claimed is:

1. A system for heating the service cabin of a machine operated by an internal combustion engine, wherein heated oil is fed by a high-pressure supply pump from the engine oil sump through an oil conduit and returned to the oil sump, a pressure-reducing element in said conduit for elevating the temperature of the oil flowing therethrough, a first line by-passing said element and having a flow control valve therein, a heat exchanger series-connected into said conduit downstream of said element and located in the service cabin for heating the area thereof, a return line extending from said heat exchanger, the improvement wherein said pump is located inside the wall casing of said engine, a housing containing said element and said control valve, said housing being sealingly mounted on said wall casing, and in communication with the inside thereof, a high-pressure section of said conduit extending from the pressure side of said pump to said element being disposed inside said wall casing, and a low-pressure section of said conduit extending from said element to said heat exchanger being disposed outwardly of said wall casing, whereby any loss of oil through said high-pressure section will be confined within said engine to thereby avoid any injury or damage outside the engine by escaping oil issuing at high pressure from said high-pressure section, and to thereby avoid exposure of the engine to danger due to an uncontrolled loss of oil.

2. The system according to claim 1, wherein said housing is mounted on an exterior surface of said wall casing, a second line in said oil conduit by-passing said heat exchanger, a flow control valve in said second line and an oil filter in said return line, said housing likewise containing said oil filter, said second line and said flow control valve therein.

3. The system according to claim 1 or 2, wherein a portion of said return line extends outwardly of said wall casing from said housing.

4. The system according to claim 1, wherein said housing is mounted on an interior surface of said wall casing, said high-pressure supply pump being mounted on said housing.

5. The system according to claim 1, 2 or 4, wherein a second line in said oil conduit by-passes said heat exchanger and includes a flow control valve, actuating elements operatively connected with said flow control valves, said actuating elements being disposed outwardly of said wall casing and being sealed off from the interior of said engine, control lines respectively extending from connecting points of said actuating elements outside said engine to said flow control valves inside said engine.

* * * * *